United States Patent
Gopalarao et al.

(10) Patent No.: US 11,321,527 B1
(45) Date of Patent: May 3, 2022

(54) EFFECTIVE CLASSIFICATION OF DATA BASED ON CURATED FEATURES

(71) Applicant: International Business Machines Corporation, Armonk, NY (US)

(72) Inventors: Maithreyi Gopalarao, Bangalore (IN); Manveer Singh Sandhu, Amritsar (IN); Rohit Athradi Shetty, Bangalore (IN); Amit Meel, Didwana (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/154,060

(22) Filed: Jan. 21, 2021

(51) Int. Cl.
*G06F 17/00* (2019.01)
*G06F 40/279* (2020.01)
*G06N 20/00* (2019.01)
*G06F 40/166* (2020.01)
*G06V 30/413* (2022.01)

(52) U.S. Cl.
CPC .......... *G06F 40/279* (2020.01); *G06F 40/166* (2020.01); *G06N 20/00* (2019.01); *G06V 30/413* (2022.01)

(58) Field of Classification Search
CPC . G06F 40/279; G06F 40/166; G06K 9/00456; G06N 20/00; G06V 30/413
USPC .......................................................... 715/255
See application file for complete search history.

(56) References Cited

U.S. PATENT DOCUMENTS

| | | | |
|---|---|---|---|
| 5,930,788 A | 7/1999 | Wical | |
| 7,028,250 B2 | 4/2006 | Ukrainczyk et al. | |
| 7,660,468 B2 * | 2/2010 | Gokturk | G06F 16/5862 |
| | | | 382/224 |
| 8,315,442 B2 | 11/2012 | Gokturk et al. | |
| 8,503,797 B2 | 8/2013 | Turkelson et al. | |
| 9,195,947 B2 | 11/2015 | Dayan et al. | |
| 9,292,737 B2 | 3/2016 | Nepomniachtchi et al. | |
| 9,589,184 B1 * | 3/2017 | Castillo | G06F 16/957 |
| 9,690,979 B2 * | 6/2017 | Gokturk | G06K 9/6255 |
| 10,409,898 B2 * | 9/2019 | Sharma | G06F 16/345 |
| 2005/0114130 A1 * | 5/2005 | Java | G06F 16/334 |
| | | | 704/240 |
| 2007/0118506 A1 * | 5/2007 | Kao | G06F 16/345 |

(Continued)

FOREIGN PATENT DOCUMENTS

| | | |
|---|---|---|
| CN | 101290626 A | 10/2008 |
| CN | 106095996 A | 11/2016 |

(Continued)

OTHER PUBLICATIONS

Soucy, Beyond TFIDF Weighting for text Categorization in the vector Space Model, ijcai.org 2005 (Year: 2005).*

(Continued)

*Primary Examiner* — Stephen S Hong
*Assistant Examiner* — Matthew J Ludwig
(74) *Attorney, Agent, or Firm* — Patterson + Sheridan, LLP (57) ABSTRACT

Techniques for machine learning using curated features are provided. A plurality of key terms is identified for a first document type of a plurality of document types. A document associated with the first document type is received, and the document is modified by inserting one or more of the plurality of key terms. A vector is generated for the modified document, and a machine learning model is trained to categorize input into the plurality of document types based on the modified document.

20 Claims, 6 Drawing Sheets

(56) References Cited

U.S. PATENT DOCUMENTS

| | | | |
|---|---|---|---|
| 2009/0171870 A1 | 7/2009 | Dasgupta et al. | |
| 2011/0271176 A1* | 11/2011 | Menday | G06F 16/367 |
| | | | 715/234 |
| 2012/0066234 A1* | 3/2012 | Lee | G06F 16/9535 |
| | | | 707/E17.084 |
| 2013/0159822 A1* | 6/2013 | Grossman | G06F 40/166 |
| | | | 715/201 |
| 2016/0162779 A1* | 6/2016 | Marcus | G06N 20/10 |
| | | | 706/12 |
| 2017/0161640 A1* | 6/2017 | Shamir | G06N 20/00 |
| 2017/0293607 A1 | 10/2017 | Kolotienko et al. | |
| 2018/0232443 A1* | 8/2018 | Delgo | G06F 16/35 |
| 2018/0285339 A1* | 10/2018 | Bostick | G06F 40/253 |
| 2018/0365201 A1* | 12/2018 | Hunn | H04L 9/3239 |
| 2018/0365579 A1* | 12/2018 | Wan | G06N 5/046 |
| 2020/0027566 A1* | 1/2020 | Bull | G16H 70/20 |
| 2020/0394567 A1* | 12/2020 | Choe | G06F 40/279 |
| 2021/0158210 A1* | 5/2021 | Kalluri | G06N 20/00 |
| 2021/0303784 A1* | 9/2021 | Brdiczka | H04L 51/04 |

FOREIGN PATENT DOCUMENTS

| | | |
|---|---|---|
| CN | 109408636 A | 3/2019 |
| EP | 3657354 A1 | 5/2020 |

OTHER PUBLICATIONS

Han Yang, Honggang Cui and Hao Tang, "A Text Classification Algorithm Based on feature weighting," AIP Conference Proceedings 1864, http://doi.Org/10.1063/1.4992843, Published Online: Aug. 3, 2017, 5 pages.

IP.com. Task Generator: An engine for generating tasks that direct users towards better document classification An IP.com Prior Art Database Technical Disclosure; Authors et al.: Disclosed Anonymously; IP.com No. IPCOM000225063D; IP.com Electronic Publication Date: Jan. 23, 2013.

* cited by examiner

EFFECTIVE CLASSIFICATION OF DATA BASED ON CURATED FEATURES

BACKGROUND

The present disclosure relates to machine learning, and more specifically, to more effective machine learning classification using curated features.

Classification is a supervised machine learning approach in which the system can learn, from input data, to separate new observations or inputs into a defined set of output categories or classifications. Data classification is a highly important process to a wide variety of systems in the modern world. Particularly as data volume increases, it is important for data to be classified accurately, efficiently, and rapidly. For example, in the financial sector, classification is a useful technique to classify general financial document types (e.g., annual reports, investment management agreements, and the like) based on the text of the document.

However, many classification tasks require distinguishing between input data where there is a high degree of overlap in the information between categories. In such cases, it is difficult to train traditional classification models that can effectively classify unknown documents into a category with a sufficient accuracy. For example, financial documents may have text or structures that are often shared across documents. In a pipeline where input data is classified in order to extract information appropriately, even a high classification accuracy of can misclassify huge numbers of documents which results in incorrect data extraction. Such errors can have serious repercussions.

Further, the amount of time required to train typical classifiers can be problematic. To train a classification model with high accuracy, a large number of input data samples are required. The training process itself can additionally take significant time (often on the order of days). Repeated training to correct misclassifications is often not be viable.

SUMMARY

According to one embodiment of the present disclosure, a method is provided. The method includes identifying a plurality of key terms for a first document type of a plurality of document types; receiving a first document associated with the first document type; modifying the first document by inserting one or more of the plurality of key terms into text of the first document; generating a first vector for the modified first document; and training a machine learning model to categorize input into the plurality of document types based on the modified first document.

According to one embodiment of the present disclosure, one or more computer-readable storage media are provided. The one or more computer-readable storage media collectively contain computer program code that, when executed by operation of one or more computer processors, performs an operation. The operation includes identifying a plurality of key terms for a first document type of a plurality of document types; receiving a first document associated with the first document type; modifying the first document by inserting one or more of the plurality of key terms into text of the first document; generating a first vector for the modified first document; and training a machine learning model to categorize input into the plurality of document types based on the modified first document.

According to one embodiment of the present disclosure, a system is provided. The system includes one or more computer processors, and one or more memories collectively containing one or more programs which when executed by the one or more computer processors performs an operation. The operation includes identifying a plurality of key terms for a first document type of a plurality of document types; receiving a first document associated with the first document type; modifying the first document by inserting one or more of the plurality of key terms into text of the first document; generating a first vector for the modified first document; and training a machine learning model to categorize input into the plurality of document types based on the modified first document.

DETAILED DESCRIPTION

Embodiments of the present disclosure provide techniques to train and use machine learning models for effective and accurate classification of input data based on curated features. In some embodiments, important features are identified for each category, and these key features are used to pre-process documents during training and/or use of classification models. In some embodiments, these features are identified by subject matter experts (SMEs).

In some embodiments, if the input data is textual, the text can be represented as a vector of terms (also referred to as "features"). Some such features can effectively distinguish a textual document of a given type from others. In one such embodiment, therefore, the system can identify such higher distinguishable keywords, terms, or phrases for each category of document and add higher weights to these features. In one embodiment, one or more of these key words or terms can be appended or otherwise inserted into input textual documents prior to training classifier models. This results in the input document having extra instances of the relevant key terms, causing the classifier model to associate these terms with increased weight during training. During runtime, the classifier is then more likely to classify documents having these key features into the appropriate category. In some embodiments, for each data type, all relevant key terms are appended or inserted. In another embodiment, the system can only insert the features that are already found in the input document.

For example, suppose a given document type of "CategoryA" is associated with key features "A," "B," and "C." In some embodiments, when a document labeled with "CategoryA" is used to train a classifier, the system can first pre-process the document to search for features "A," B," or "C." For each feature found in the document, this feature can be inserted into the document. For example, if the document has two instances of the "A" feature (e.g., two instances of a particular phrase or term) and one instance of the "B" feature, the system can append the "A" feature twice and the "B" feature once. The modified document (with the extra appended features) can then be used to train the machine learning model.

In some embodiments, during runtime, a similar process can be utilized. For example, when new input data (e.g., a new textual document) is received for classification, the system may search the data for all of the curated features (for all classifications). For each feature identified in the new data, the system may similarly append the same feature to the data before processing it using the trained model(s). In this way, the system is able to classify input data more accurately, even when the categories have significant overlap. Although document classification is used in some examples discussed herein, embodiments of the present disclosure can be readily applied to any data classification using any relevant features.

Figure 1:
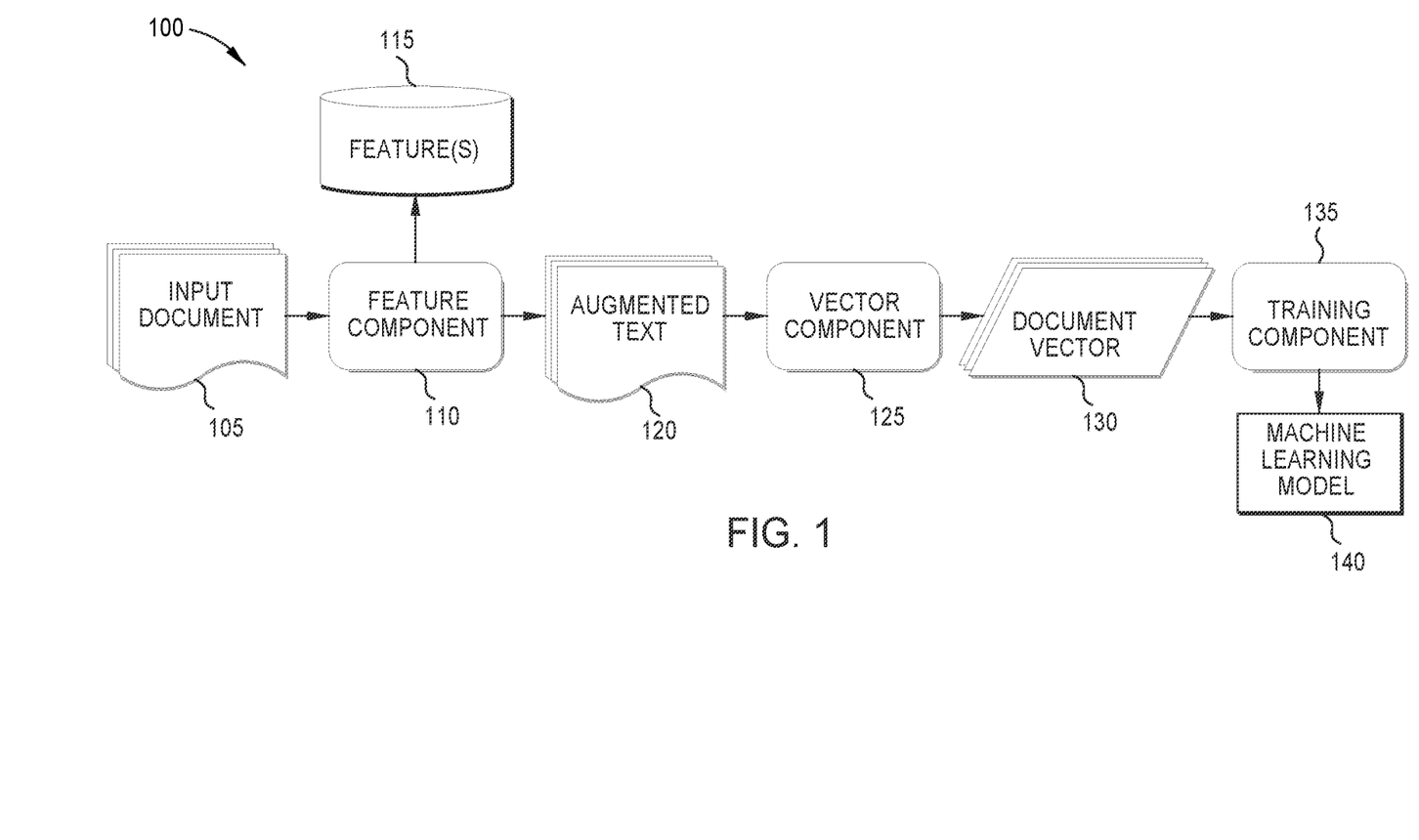
FIG. 1 depicts a workflow for training machine learning models based on curated features, according to some embodiments disclosed herein.

FIG. 1 depicts a workflow 100 for training machine learning models based on curated features, according to some embodiments disclosed herein. In the illustrated embodiment, Input Documents 105 are received to train one or more machine learning classifiers. In one embodiment, the Input Documents 105 include natural language textual data. For example, the Input Documents 105 may correspond to textual documents of varying types or categories. In an embodiment, each Input Document 105 is associated with a label indicating the category to which it belongs.

As illustrated, a Feature Component 110 can preprocess the Input Documents 105 based on a curated set of Features 115. Generally, the Features 115 specify, for each category or classification, a set of key terms or features. For example, for textual documents, the Features 115 may indicate terms, phrases, or words that are associated with each category of document. In some embodiments, the Features 115 are specified or manually curated by one or more users (such as SMEs).

In the illustrated workflow 100, the Feature Component 115 uses the Features 115 to modify the Input Documents 105 in order to generate Augmented Text 120. In some embodiments, the Feature Component 110 does so by, for each Input Document 105, determining the corresponding category/label and identifying the relevant set of Features 115. The Feature Component 110 can then search the Input Document 105 for the relevant set of Features 115. For each such feature identified, the Feature Component 110 can insert the feature into the Input Document 105 to generate corresponding Augmented Text 120.

For example, suppose an Input Document 105 includes text such as "lorem ipsum dolor sit amet." Suppose further that the relevant key Features 115 for the category of the Input Document 105 are "lorem," "ipsum," and "minim." In an embodiment, the Feature Component 110 may generate Augmented Text 120 that includes an extra instance of "lorem" and "ipsum," as these are present in the Input Document 105. In various embodiments, this may include inserting the identified feature(s) at the location(s) they are found (e.g., "lorem lorem ipsum ipsum dolor sit amet"), appending them to the end (e.g., "lorem ipsum dolor sit amet lorem ipsum"), and the like.

In some embodiments, the Feature Component 110 refrains from inserting features that are not already identified in the Input Document 105. Continuing the above example, the Feature Component 110 may refrain from inserting the "minim" feature. In another embodiment, the Feature Component 110 may insert all features for the category, regardless of whether they are already present in the Input Document 105.

In at least one embodiment, the Feature Component 110 can modify the Input Document 105 by inserting each located feature once. For example, if a given feature is found at least once in the input text, the Feature Component 110 may insert that feature a single time regardless of the actual number of times it was found. In another embodiment, the Feature Component 110 may insert the feature once for each instance in the Input Document 105. For example, if a given feature is found five times, the Feature Component 110 may insert that feature five separate times (once where each instance of the feature was found, all inserted at the end of the document, and the like).

In the illustrated workflow 100, this process is performed for each Input Document 105 to generate, for each input document, a corresponding set of Augmented Text 120. As illustrated, this Augmented Text 120 is then processed by a Vector Component 125 to generate a corresponding Document Vector 130. In some embodiments, prior to vectorization, the system can first perform other pre-processing, such as removing punctuation and stop words. In embodiments, the Vector Component 125 can use any suitable technique to vectorize the input text (e.g., Word2Vec). Because the Document Vectors 130 are generated for the Augmented Text 105 rather than the original Input Documents 105, they will generally reflect the relevant Features 115 more strongly than the original documents.

In the illustrated embodiment, these Document Vectors 130 are provided to a Training Component 135 which uses them, in conjunction with the corresponding label of each, to train one or more Machine Learning Models 140. For example, the Training Component 135 may provide a given Document Vector 130 as input to a machine learning model to generate a classification. This model may be a partially trained model, a model initialized with random weights or parameters, and the like. The Training Component 135 may then compute a loss by comparing the generated classification with the actual classification (indicated by the corresponding label). This loss can then be used to refine the model (e.g., using back propagation). In embodiments, the Training Component 135 may utilize batch training, continuous training, and the like.

In an embodiment, the Machine Learning Model 140 is thereby trained to classify input documents into corresponding categories. Because the identified features are added to the input to generate augmented text, the features are afforded additional weight by the model. This allows the Machine Learning Model 140 to more accurately classify documents, even if the categories have significant overlap and shared features.

Figure 2:
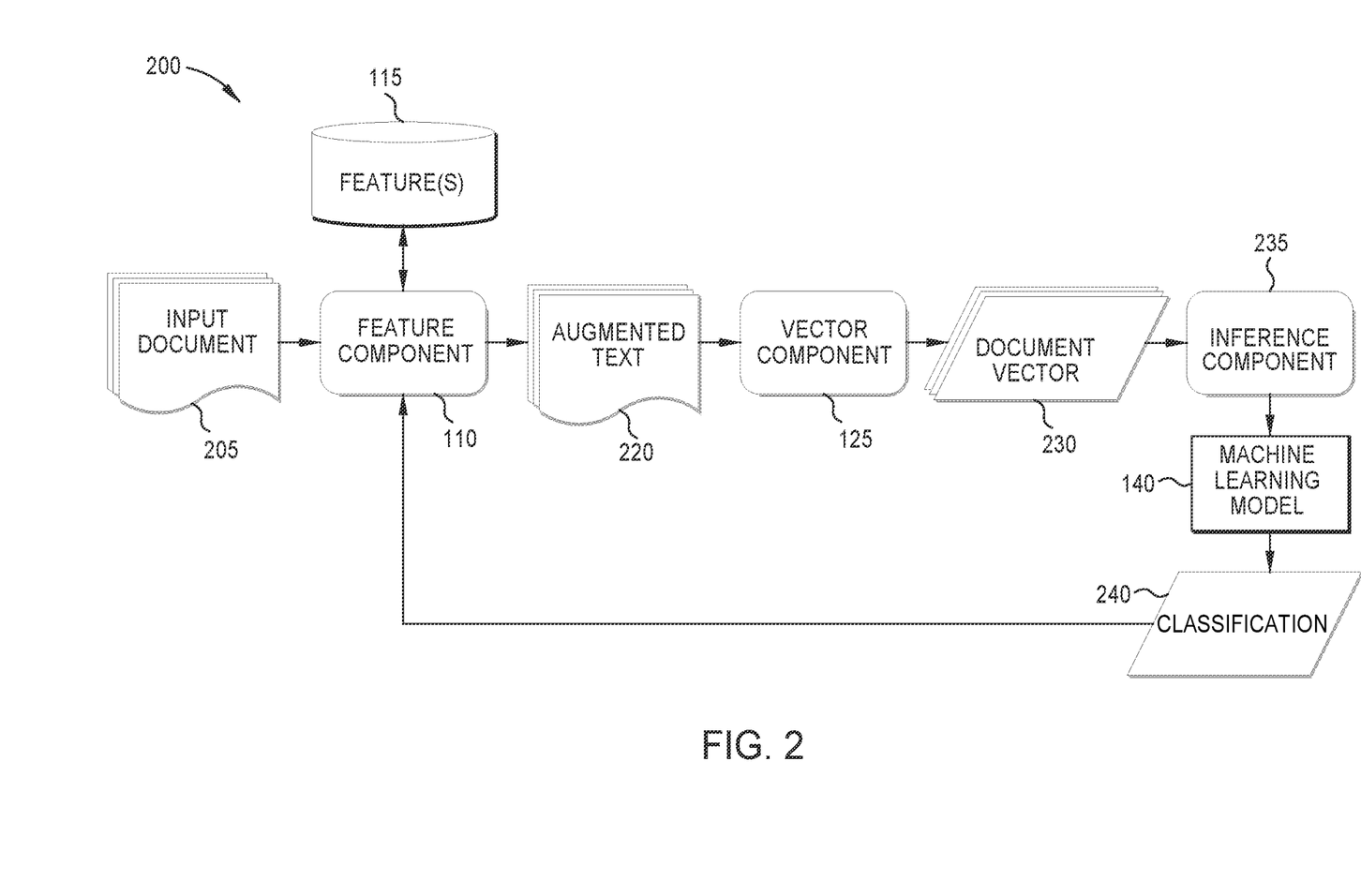
FIG. 2 depicts a workflow for using machine learning models trained based on curated features, according to some embodiments disclosed herein.

FIG. 2 depicts a workflow 200 for using machine learning models trained based on curated features, according to some embodiments disclosed herein. In the illustrated embodiment, Input Documents 205 are received during runtime. The Feature Component 110 may process these Input Documents 205, using the Features 115, to generate Augmented Text 220. Because the Input Document 205 is received during runtime, the correct classification may generally be unknown and the appropriate set of Features 115 may therefore similarly be unknown. In an embodiment, therefore, the Feature Component 110 may search the Input Document 205 based on all of the identified Features 115 for any category. Each time one of the Features 115 is identified, this feature can be inserted appended into the document, as discussed above.

Although this may result in features associated with incorrect classifications to be inserted, the resulting Augmented Text 220 will still typically be weighted further towards the correct classification if the selected Features 115 are accurate. As illustrated, this Augmented Text 220 is processed by a Vector Component 125 to generate a Document Vector 230, as discussed above. The Document Vector 230 is then received by an Inference Component 235.

In the illustrated embodiment, the Inference Component 235 processes the Document Vector 230 using the trained Machine Learning Model(s) 140 to generate a Classification 240. As discussed above, by using the curated Features 115, this Classification 240 is generally more accurate and reliable than those generated by traditional systems.

In some embodiments, if this Classification 240 is determined to be inaccurate (e.g., by a human reviewer), it is used by the Feature Component 110 to re-process the original Input document 205. For example, in one embodiment, the Feature Component 110 and/or a human reviewer can evaluate the Input Document 205 to determine whether any Feature(s) 115 in the input text were missed (e.g., due to misspellings, punctuation, and the like).

In at least one embodiment, the human user can also provide new features for the category. For example, the user (or users) may determine that one or more new terms should be added as key terms for the category. In some embodiments, these new key terms are used to re-train the Machine Learning Model 140, as discussed above.

In some embodiments, however, such re-training may be impractical due to the time and resources required. In one such embodiment, the Feature Component 110 can nevertheless search input documents for the newly-defined features. If any are found, the Feature Component 110 can insert them into the text. In at least one embodiment, if any new features are found (e.g., features which were not used to train the model), the system can insert one or more of the previously-defined features (e.g., features which were used to train the model). For example, if a new feature "Z" is found in the Input Document 205, the system may determine the category with which the new feature is associated, identify other feature(s) for that category (which were used to train the model), and insert one or more of these other features into the text.

This allows the system to weight the document more heavily towards the correct classification, even if the newly-identified features were not used during training. Additionally, such a process enables the system to effectively refine the accuracy and performance of the model(s) without requiring them to be re-trained, which significantly reduces the time and computational expense required to improve the system.

Although the illustrated workflow 200 includes generating Augmented Text 220 for input documents during runtime, in some embodiments, the original and unaltered text can be categorized by the Machine Learning Model 140. Because the model was trained using augmented text, it can perform more accurately than traditional models, even if the runtime text is not augmented.

Figure 3:
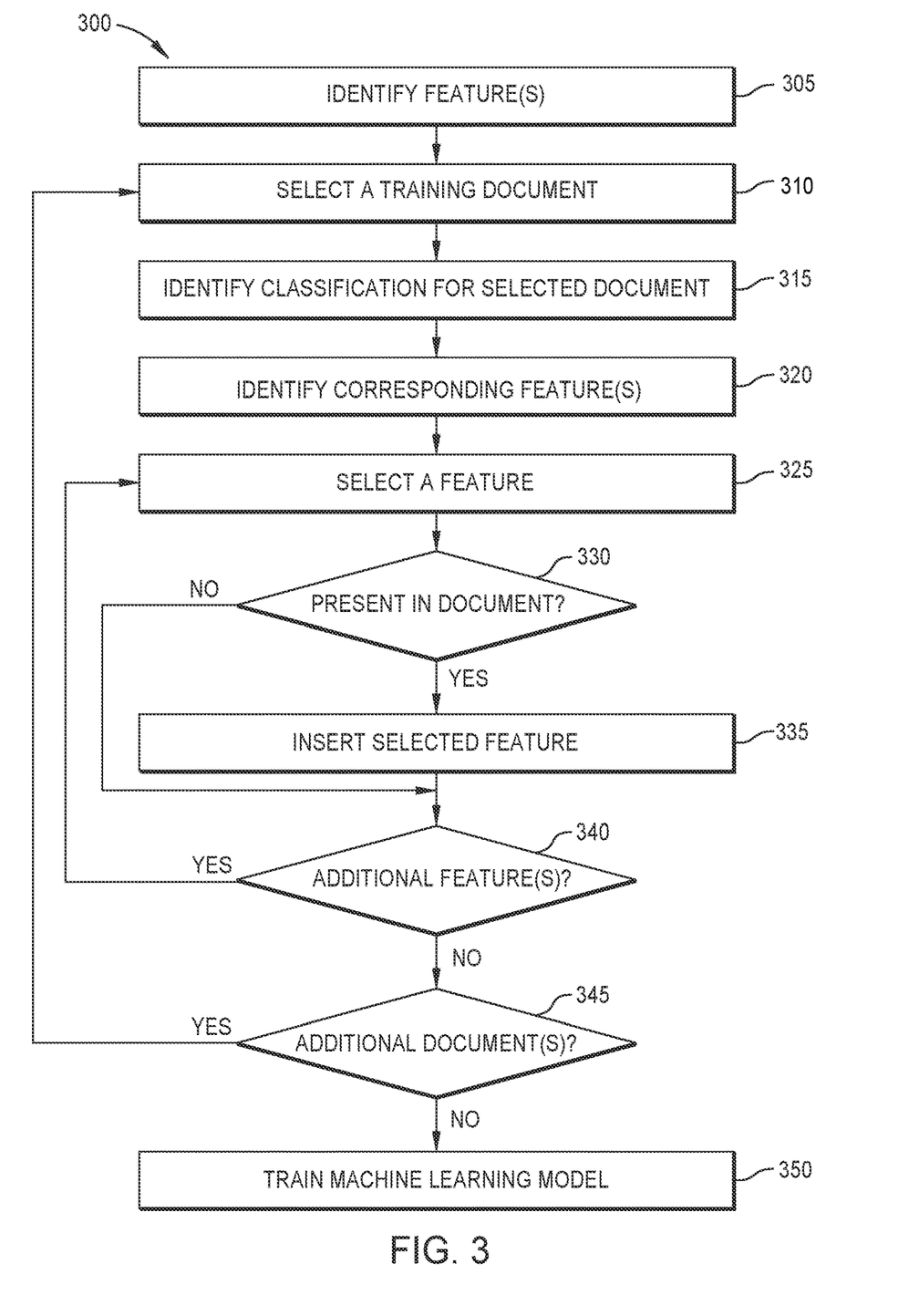
FIG. 3 is a flow diagram illustrating a method for training machine learning models based on curated features, according to some embodiments disclosed herein.

FIG. 3 is a flow diagram illustrating a method 300 for training machine learning models based on curated features, according to some embodiments disclosed herein. The method 300 begins at block 305, where the system identifies key features for one or more categories of data. For example, in the case of textual data, the system can identify key terms that are associated with each category of document. In some embodiments, the features are provided by one or more SMEs.

At block 310, the system selects a training document from a set of documents that are to be used to train the model(s). Generally, each training document includes textual data and a corresponding label or other identifier indicating the category to which the document belongs. The method 300 then continues to block 315, where the system identifies the correct classification for the selected document.

For example, based on a label associated with the document, the system can determine the type of the document so the model(s) can be trained to classify documents based on their type. At block 320, the system identifies the corresponding features for the determined classification. As discussed above, each category may be associated with a set of features that are associated with the category because they are indicative of the document type. That is, the features associated with a given category, when present in an input document, tend to indicate that the input document belongs to the given category.

The method 300 then continues to block 325, where the system selects one of the identified features. At block 330, the system determines whether the selected feature is already present in the selected document. If not, the method 300 continues to block 340. If the selected feature is present at least once in the selected document, the method 300 continues to block 335, where the system inserts the selected feature into the document. That is, if the document includes at least one instance of the feature, the system inserts another instance of the feature. In at least one embodiment, the system can insert the feature each time it is found in the selected document, such that the number of instances of the feature is effectively doubled. That is, if the feature is found twice, the system will insert it twice more (resulting in four total instances).

The method 300 then continues to block 340, where the system determines whether one or more additional feature(s) associated with the determined category remain to be evaluated. If so, the method 300 returns to block 325. If not, the method 300 continues to block 345, where the system determines whether there are any additional training documents that have not yet been evaluated. If so, the method 300 returns to block 310.

Otherwise, the method 300 continues to block 350, where the system trains one or more machine learning models based on the modified documents (with features inserted). In one embodiment, as discussed above, this includes vectorising the modified text.

The illustrated method 300 depicts iterative evaluation of each feature for conceptual clarity. In embodiments, however, the features may be evaluated in differing orders or sequences. For example, in some embodiments, the system can parse an input document searching for any of the identified features simultaneously.

Figure 4:
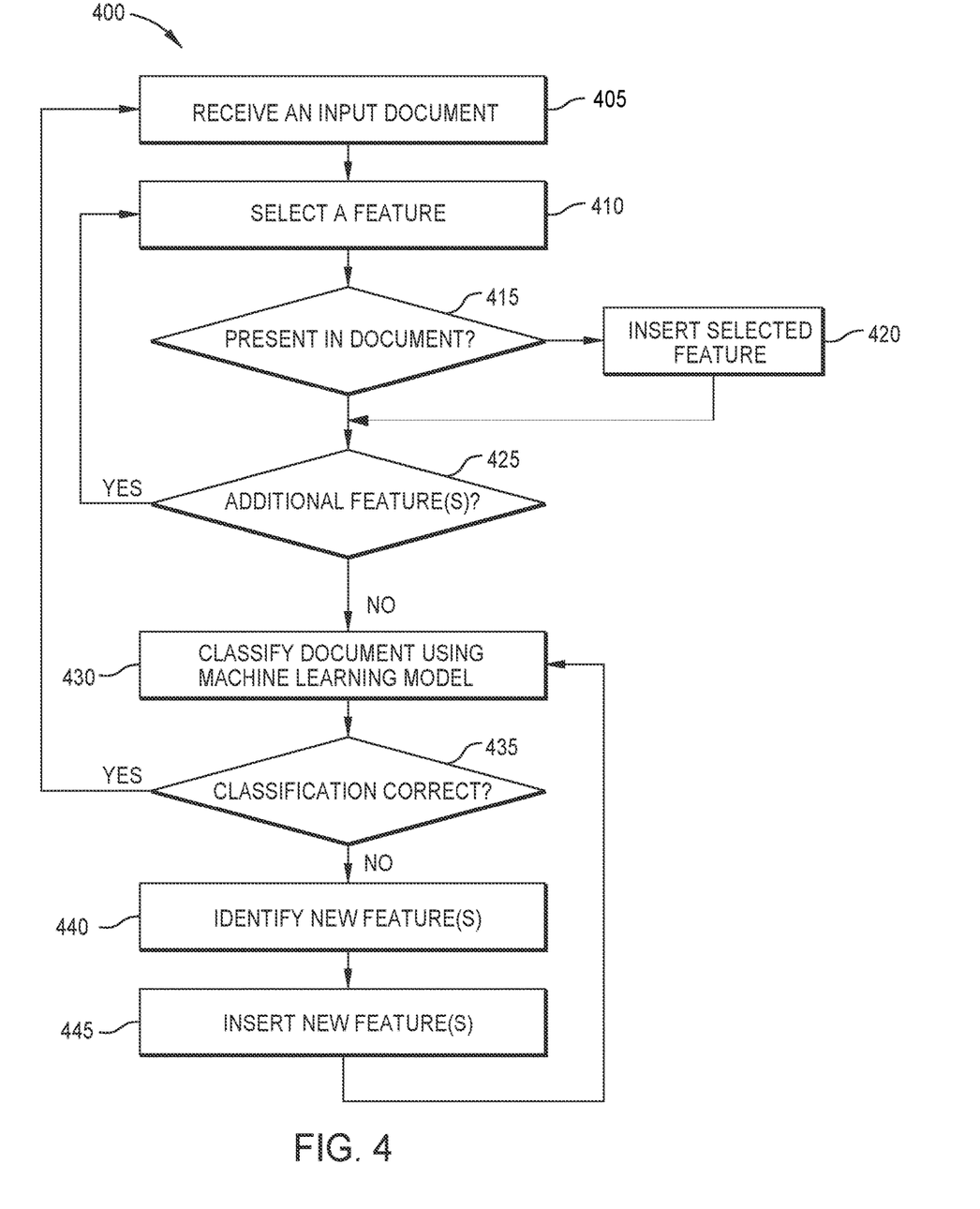
FIG. 4 is a flow diagram illustrating a method for using machine learning models to classify data based on curated features, according to some embodiments disclosed herein.

FIG. 4 is a flow diagram illustrating a method 400 for using machine learning models to classify data based on curated features, according to some embodiments disclosed herein. In the illustrated embodiment, the method 400 begins at block 405, where a new input document is received at runtime.

At block 410, the system selects one of the features in the curated set of features. In an embodiment, when the classification of the newly-received document is unknown, the system can use all of the identified features for each input document (rather than a subset of the features specifically associated with a given category). That is, to classify documents during runtime, the system may use all available features to evaluate the document.

At block 415, the system determines whether the selected document is present in the newly-received input. If not, the method 400 continues to block 425. If the feature is found at least once, the method 400 continues to block 420 where the system inserts the selected feature into the document. For example, as discussed above, the system may insert the selected feature into the document each time the feature is found in the unmodified document. The method 400 then continues to block 425.

At block 425, the system determines whether there is at least one additional feature in the database that has not yet been used to search the new document. If so, the method 400 returns to block 410. If all of the possible features have been identified, the method 400 continues to block 430.

The illustrated method 400 depicts iterative evaluation of each feature for conceptual clarity. In embodiments, however, the features may be evaluated in differing orders or sequences. For example, in some embodiments, the system can parse an input document searching for any of the identified features simultaneously.

At block 430, the system classifies the received document using the one or more trained machine learning models. In some embodiments, this classification is returned, or used by the system to perform one or more downstream processing steps (such as extracting data from the original input document). In some embodiments, the method 400 ends after the document is classified.

In the illustrated embodiment, however, it is determined whether the classification is correct (at block 435). For example, a user may determine whether the classification is correct (e.g., by randomly evaluating a subset of the classifications). In some embodiments, the system can automatically determine whether the classification was correct (e.g., based on whether one or more downstream processing steps that depend on the classification were completed successfully).

If the classification is accurate, the method 400 returns to block 405 to receive a new document. If the classification is incorrect, however, the method 400 continues to block 440.

At block 440, the system identifies one or more new features for the correct classification. That is, the system can determine what the correct classification is (e.g., based on input from a user or SME), and identify one or more new features for this category. In some embodiments, identifying new features includes searching the received document for variants of the features that are already associated with the category. For example, the system and/or a user may search for misspellings, acronyms, synonyms, and the like for the existing features.

In some embodiments, identifying new features can include receiving entirely new features (e.g., from an SME) that were not used to train the model(s), but that can be used to identify the category. For example, over time, the SMEs may determine that one or more features should be added to the list of features associated with a given category.

The block 400 then continues to block 445, where the system inserts any newly-found features into the input document. For example, if a variant of an existing feature is found, the system can insert the corresponding feature. In some embodiments, if an entirely new feature is found, the system will similarly insert the new feature. In at least one embodiment, if an entirely new feature (that was not used to train the model) is found, the system can insert one or more of the existing features (that were used to train the model) for the category. That is, because the model was not trained specifically for the new feature, inserting it may not have significant impact on the resulting classification. However, by inserting one or more of the existing features, the system can effectively increase the weight of the new feature by artificially adding the existing feature.

The method 400 then returns to block 430 to re-classify the document based on the new modifications. This can improve the accuracy of the system. In some embodiments, the newly-identified features (e.g., variants and entirely new features) can be stored in a database for subsequent use with other newly-received documents during runtime. This allows new documents to be accurately classified without requiring the underlying models to be re-trained.

In the illustrated embodiment, all newly-received documents are evaluated based on the existing features. In some embodiments, this process is only performed if the document is incorrectly classified. For example, the document may be vectorized and categorized using the models. If the classification is inaccurate, the prior-identified features can be used to augment the document. This augmented document may then be evaluated more accurately.

Figure 5:
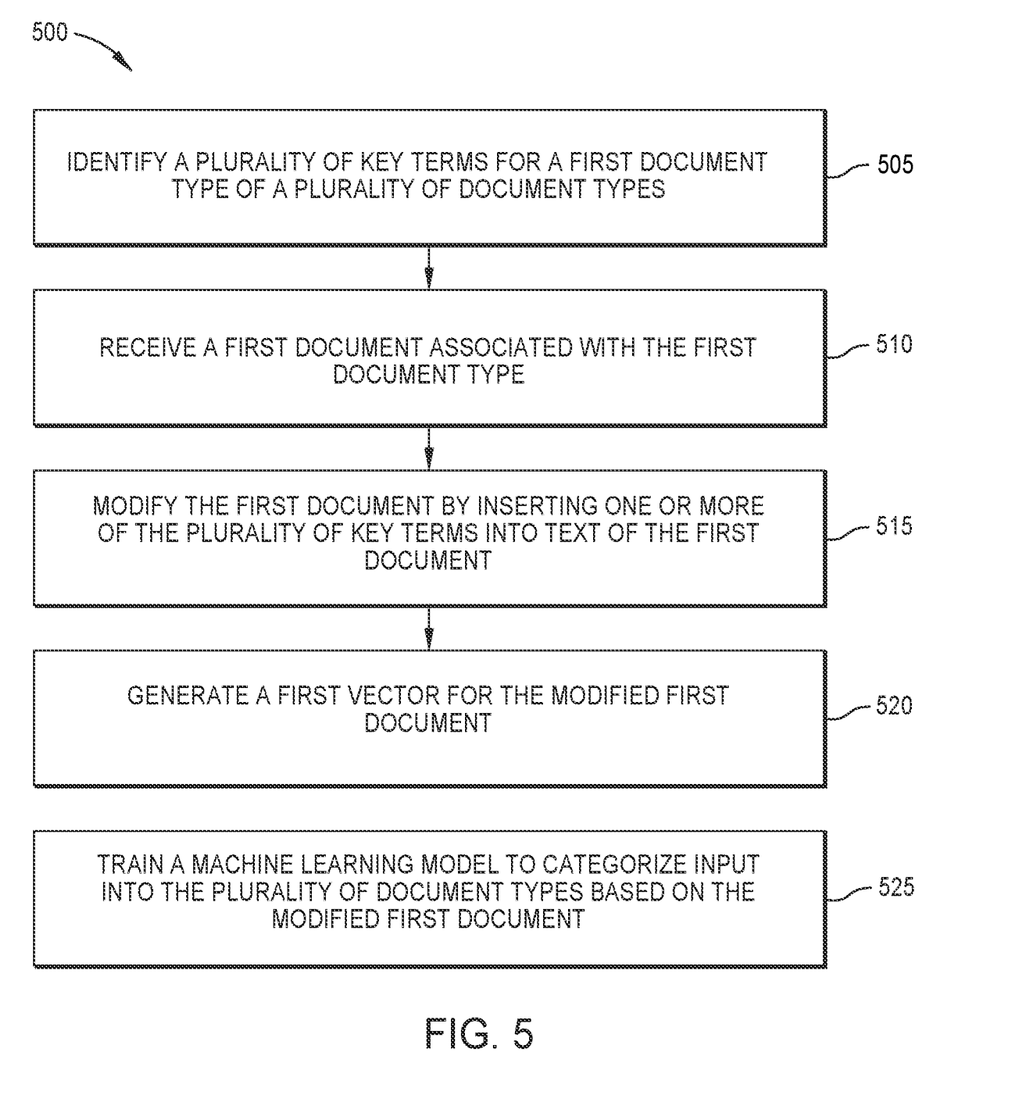
FIG. 5 is a flow diagram illustrating a method for training machine learning models based on curated features, according to some embodiments disclosed herein.

FIG. 5 is a flow diagram illustrating a method 500 for training machine learning models based on curated features, according to some embodiments disclosed herein. The method 500 begins at block 505, where a system identifies a plurality of key terms for a first document type of a plurality of document types.

At block 510, the system receives a first document associated with the first document type. The method 500 then continues to block 515, where the system modifies the first document by inserting one or more of the plurality of key terms into text of the first document.

At block 520, the system generates a first vector for the modified first document. Further, at block 525, the system trains a machine learning model to categorize input into the plurality of document types based on the modified first document.

Figure 6:
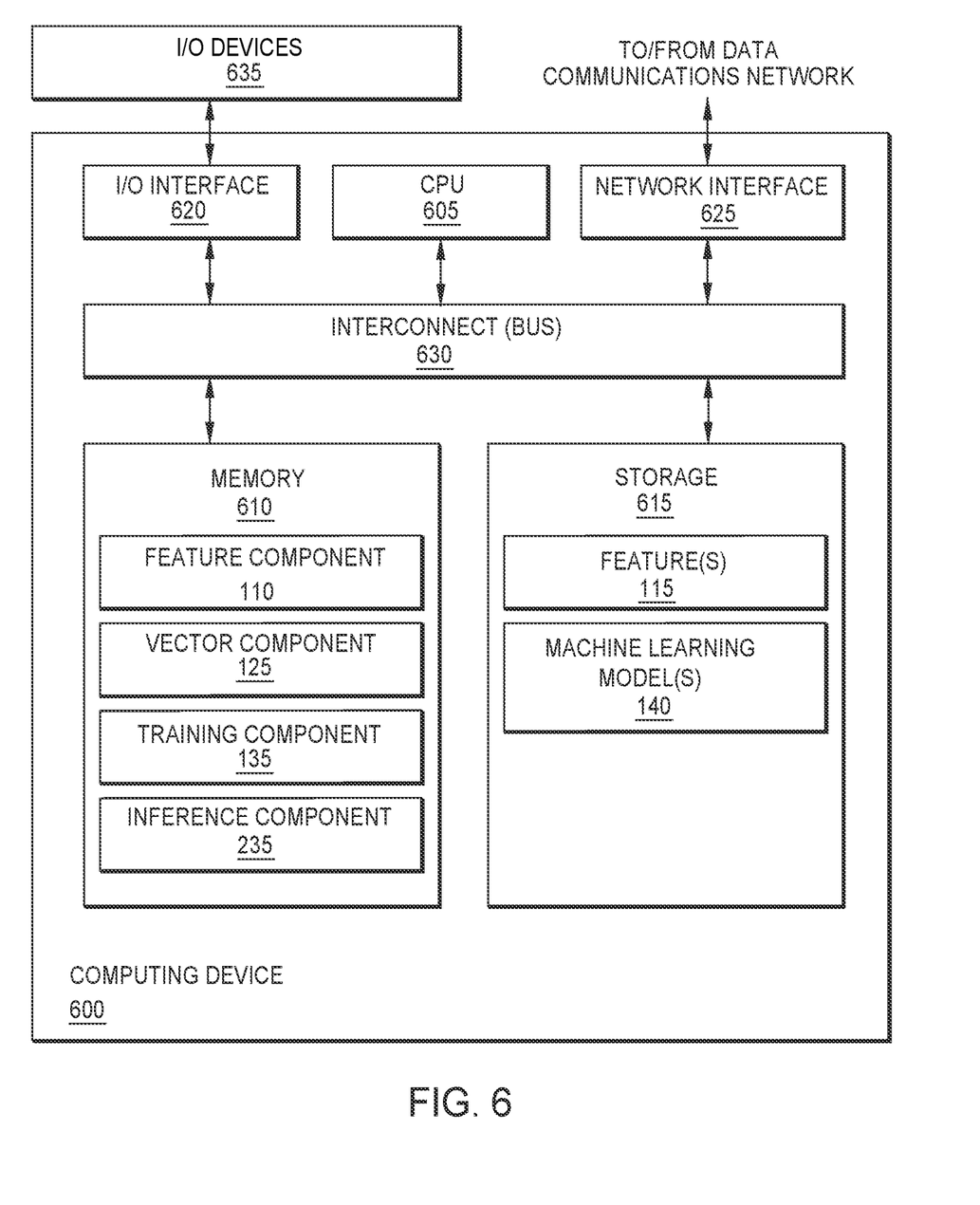
FIG. 6 is a block diagram illustrating a computing device configured to train machine learning models based on curated features, according to some embodiments disclosed herein.

FIG. 6 is a block diagram illustrating a Computing Device 600 configured to train machine learning models based on curated features, according to some embodiments disclosed herein. Although depicted as a physical device, in embodiments, the Computing Device 600 may be implemented using virtual device(s), and/or across a number of devices (e.g., in a cloud environment). As illustrated, the Computing Device 600 includes a CPU 605, Memory 610, Storage 615, a Network Interface 625, and one or more I/O Interfaces 620. In the illustrated embodiment, the CPU 605 retrieves and executes programming instructions stored in Memory 610, as well as stores and retrieves application data residing in Storage 615. The CPU 605 is generally representative of a single CPU and/or GPU, multiple CPUs and/or GPUs, a single CPU and/or GPU having multiple processing cores, and the like. The Memory 610 is generally included to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O Devices 635 (such as keyboards, monitors, etc.) are connected via the I/O Interface(s) 620. Further, via the Network Interface 625, the Computing Device 600 can be communicatively coupled with one or more other devices and components (e.g., via a network, which may include the Internet, local network(s), and the like). As illustrated, the CPU 605, Memory 610, Storage 615, Network Interface(s) 625, and I/O Interface(s) 620 are communicatively coupled by one or more Buses 630.

In the illustrated embodiment, the Storage 615 includes a set of one or more Features 115 and Machine Learning Models 140. Although depicted as residing in Storage 615, in embodiments, the Features 115 and Machine Learning Models 140 may reside in any suitable location.

In an embodiment, the Features 115 are key terms, phrases, or other features that can help distinguish between categories of input data. For example, for text classification, the Features 115 can include terms, phrases, and words that are strongly associated with each category. In some embodiments, the Features 115 are defined and/or periodically updated by SMEs in a manual curation process. The Machine Learning Models 140 generally represent a set of weights and parameters needed to instantiate a trained classifier model. In embodiments, the Machine Learning Models 140 were trained using input data that was augmented based on the Features 115, as discussed above.

In the illustrated embodiment, the Memory 610 includes a Feature Component 110, Vector Component 125, Training Component 135, and Inference Component 235. Although depicted as software residing in Memory 610, in embodiments, the functionality of the Feature Component 110, Vector Component 125, Training Component 135, and Inference Component 235 may be implemented using software, hardware, or a combination of software and hardware.

As discussed above, the Feature Component 110 generally augments input data based on the defined Features 115. In one embodiment, for each instance of a given feature in the input data, the Feature Component 110 inserts a second instance of the feature. This doubles the number of times the feature appears in the input, which effectively increases its weight and increases the accuracy of the machine learning models.

The Vector Component 125 generally generates vectors for the input data. In some embodiments, the Vector Component 125 (or another component) may also perform other pre-processing such as stop word removal.

As discussed above, the Training Component 135 and Inference Component 235 generally train and use the Machine Learning Models 140 to classify input data into discrete categories based at least in part on the Features 115. Although the illustrated Computing Device 600 includes both a Training Component 135 and an Inference Component 235, in some embodiments, training and inferencing can be performed by discrete devices. For example, one system may train the Machine Learning Models 140 while one or more other systems use the models to perform inferencing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., applications including the Feature Component 110, Vector Component 125, Training Component 135, and/or Inference Component 235) or related data available in the cloud. For example, the system could execute on a computing system in the cloud and train models based on curated features. In such a case, the system could identify features and augment input data using those features, and store the features and resulting models at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   identifying a predefined set of key terms for a first document type of a plurality of document types;
   receiving a first document of the first document type;
   in response to identifying a first instance of a first key term, of the predefined set of key terms, in text of the first document, modifying the first document by inserting a second instance of the first key term into the text of the first document;

generating a first document vector for the modified first document including at least the first instance and the second instance of the first key term;

training a machine learning model based on the first document vector for the modified document comprising:

associating the first key term with an increased weight in response to the second instance of the key term inserted into the first document, as compared to a weight of at least one term that is not included in the predefined set of key terms; and categorizing the first document into at least one of the plurality of document types based on the first document vector for the modified first document.

2. The method of claim 1, wherein inserting the second instance of the first key term into the text of the first document comprises appending the first key term at end of the first document.

3. The method of claim 2, wherein modifying the first document further comprises:

upon failing to locate a second key term, of the predefined set of key terms, in the text of the first document, refraining from inserting the second key term into the text of the first document.

4. The method of claim 2, wherein modifying the first document comprises:

for each respective instance of the first key term located in the text of the first document, inserting a respective new instance of the first key term into the text of the first document.

5. The method of claim 1, the method further comprising:

receiving a second document for classification using the trained machine learning model;

upon locating a third instance of the first key term, of the predefined set of key terms, in text of the second document, modifying the second document by inserting a fourth instance of the first key term into the text of the second document;

generating a second document vector for the modified second document; and classifying the second document by processing the second document vector using the trained machine learning model.

6. The method of claim 1, the method further comprising:

identifying a new key term that was not used when training the machine learning model;

receiving a second document for classification using the trained machine learning model;

upon locating a first instance of the new key term, of the plurality predefined set of key terms, in text of the second document, modifying the second document by inserting a second instance of the new key term into the text of the second document;

generating a second document vector for the modified second document; and classifying the second document by processing the second document vector using the trained machine learning model.

7. The method of claim 6, wherein identifying the new key term is performed upon determining that the second document was misclassified by the trained machine learning model.

8. One or more non-transitory computer-readable storage medium collectively containing computer program code that, when executed by operation of one or more computer processors, performs an operation comprising:

identifying a predefined set of key terms for a first document type of a plurality of document types;

receiving a first document of the first document type;

in response to identifying a first instance of a first key term, of the predefined set of key terms, in text of the first document, modifying the first document by inserting a second instance of the first key term into the text of the first document;

generating a first document vector for the modified first document including at least the first and second instances of the first key term; and training a machine learning model based on the first document vector for the modified document comprising:

associating the first key term with an increased weight in response to the second instance of the first key term inserted into the first document, as compared to a weight of at least one term that is not included in the predefined set of key terms; and categorizing the first document into at least one of the plurality of document types based on the first document vector for the modified first document.

9. The computer-readable storage medium of claim 8, wherein modifying the first document comprises:

inserting the second instance of the first key term into the text of the first document comprises appending the first key term at end of the first document.

10. The computer-readable storage medium of claim 9, wherein modifying the first document further comprises:

upon failing to identify a second key term, of the predefined set of key terms, in the text of the first document, refraining from inserting the second key term into the text of the first document.

11. The computer-readable storage medium of claim 9, wherein modifying the first document comprises:

for each respective instance of the first key term located in the text of the first document, inserting a respective new instance of the first key term into the text of the first document.

12. The computer-readable storage medium of claim 8, the operation further comprising:

receiving a second document for classification using the trained machine learning model;

in response to identifying a third instance of the first key term, of the predefined set of key terms, in text of the second document, modifying the second document by inserting a fourth instance of the first key term into the text of the second document;

generating a second document vector for the modified second document; and classifying the second document by processing the second document vector using the trained machine learning model.

13. The computer-readable storage medium of claim 8, the operation further comprising:

identifying a new key term that was not used when training the machine learning model;

receiving a second document for classification using the trained machine learning model;

in response to identifying a first instance of the new key term, of the predefined set of key terms, in text of the second document, modifying the second document by inserting a second instance of the new key term into the text of the second document;

generating a second document vector for the modified second document; and classifying the second document by processing the second document vector using the trained machine learning model.

14. The computer-readable storage medium of claim 13, wherein identifying the new key term is performed upon determining that the second document as misclassified by the trained machine learning model.

15. A system comprising:
One or more computer processors; and
One or more memories collectively containing one or more programs which when executed by the one or more computer processors performs an operation, the operation comprising:
identifying a predefined set of key terms for a first document type of a plurality of document types;
receiving a first document of the first document type;
in response to identifying a first instance of a first key term, of the predefined set of key terms, in text of the first document, modifying the first document by inserting a second instance of the first key term into the text of the first document;
generating a first document vector for the modified first document including at least the first instance and the second instance of the first key term;
training a machine learning model based on the first document vector for the modified document comprising:
associating the first key term with an increased weight in response to the second instance of the key term inserted into the first document, as compared to a weight of at least one term that is not included in the predefined set of key terms; and
categorizing the first document into at least one of the plurality of document types based on the first document vector for the modified first document.

16. The system of claim 15, wherein
inserting the second instance of the first key term into the text of the first document comprises appending the first term at end of the first document.

17. The system of claim 16, wherein modifying the first document further comprises:

upon failing to locate a second key term, of the predefined set key terms, in the text of the first document, refraining from inserting the second key term into the text of the first document.

18. The system of claim 16, wherein modifying the first document comprises:
for each respective instance of the first key term located in the text of the first document, inserting a respective new instance of the first key term into the text of the first document.

19. The system of claim 15, the operation further comprising:
receiving a second document for classification using the trained machine learning model;
upon locating a third instance of the first key term, of the predefined set of key terms, in text of the second document, modifying the second document by inserting a fourth instance of the first key term into the text of the second document;
generating a second document vector for the modified second document; and
classifying the second document by processing the second document vector using the trained machine learning model.

20. The system of claim 15, the operation further comprising:
identifying a new key term that was not used when training the machine learning model;
receiving a second document for classification using the trained machine learning model;
upon locating a first instance of the new key term, of the predefined set of key terms, in text of the second document, modifying the second document by inserting a second instance of the new key term into the text of the second document;
generating a second document vector for the modified second document; and
classifying the second document by processing the second document vector using the trained machine learning model.

* * * * *